US 12,422,194 B1

United States Patent
Weems

(10) Patent No.: US 12,422,194 B1
(45) Date of Patent: Sep. 23, 2025

(54) HEATING AND COOLING OF BUILDINGS USING UNDERGROUND HEAT STORAGE WITH HORIZONTAL BORES

(71) Applicant: UIPCO, LLC, San Antonio, TX (US)

(72) Inventor: John Andrew Weems, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 51 days.

(21) Appl. No.: 18/316,270

(22) Filed: May 12, 2023

Related U.S. Application Data

(60) Provisional application No. 63/341,575, filed on May 13, 2022.

(51) Int. Cl.
   *F28D 20/00* (2006.01)
(52) U.S. Cl.
   CPC .................. *F28D 20/0043* (2013.01)
(58) Field of Classification Search
   CPC ....... F28D 20/0043; F24T 10/10; F24T 10/17; F24T 10/13; F24T 10/15
   USPC .......................................................... 165/10
   See application file for complete search history.

(56) References Cited

U.S. PATENT DOCUMENTS

| | | | |
|---|---|---|---|
| 10,527,026 B2 | 1/2020 | Muir | |
| 10,605,491 B2 | 3/2020 | McBay | |
| 11,092,360 B2 | 8/2021 | Park | |
| 11,619,404 B2 | 4/2023 | Konyari | |
| 11,661,821 B2 * | 5/2023 | Toews | E21B 36/001 166/302 |
| 12,140,028 B2 * | 11/2024 | Toews | E21B 7/18 |
| 12,241,660 B2 * | 3/2025 | Toews | E21B 43/30 |
| 2007/0056304 A1 * | 3/2007 | Everett | F24F 5/0075 62/260 |
| 2007/0245729 A1 | 10/2007 | Mickleson | |
| 2014/0262137 A1 * | 9/2014 | McBay | F24T 10/30 165/45 |
| 2023/0341152 A1 | 10/2023 | Daprocida | |
| 2024/0035710 A1 * | 2/2024 | Toews | E21B 43/305 |

OTHER PUBLICATIONS

Non-Final Office Action mailed Feb. 13, 2025 for U.S. Appl. No. 18/316,267.

* cited by examiner

*Primary Examiner* — Jon T. Schermerhorn, Jr.
(74) *Attorney, Agent, or Firm* — Plumsea Law Group, LLC

(57) ABSTRACT

A system for heating and cooling buildings using geothermal heat storage includes a heat exchange system coupled to a heat storage medium including rock. The heat exchange system comprises pipes running through boreholes in the rock. The pipes of the heat exchange system are connected to pipes used within the building for heating and cooling the building. The system stores excess heat collected during the summer in the rock and discharges heat from the rock during the winter. The pipes of the heat exchange system may be arranged horizontally, and configured to run under the foundation of a building. Horizontal bores containing the pipes can be constructed using directional drilling techniques.

16 Claims, 11 Drawing Sheets

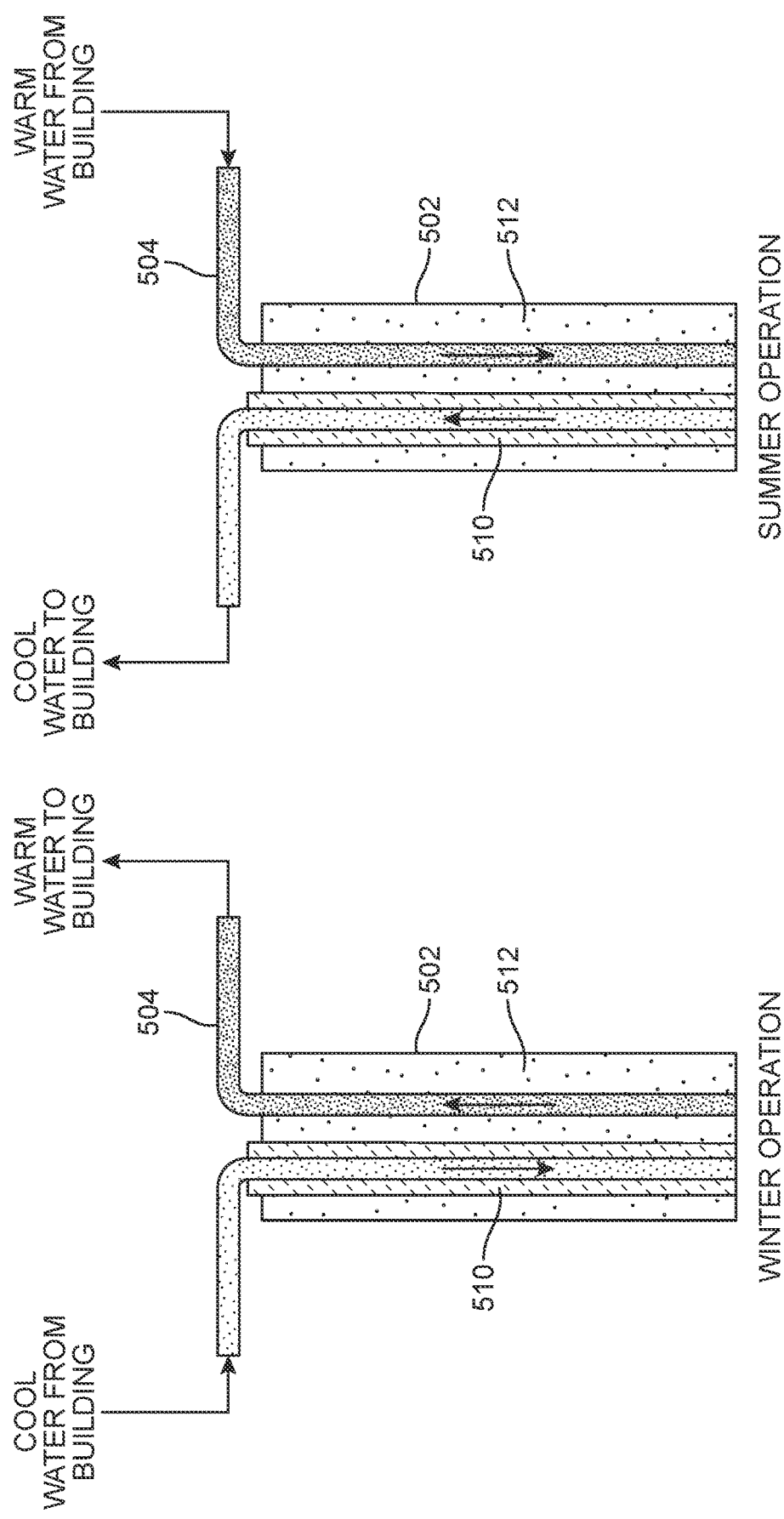

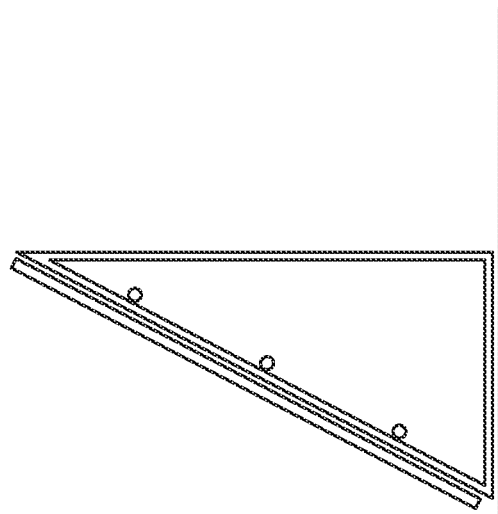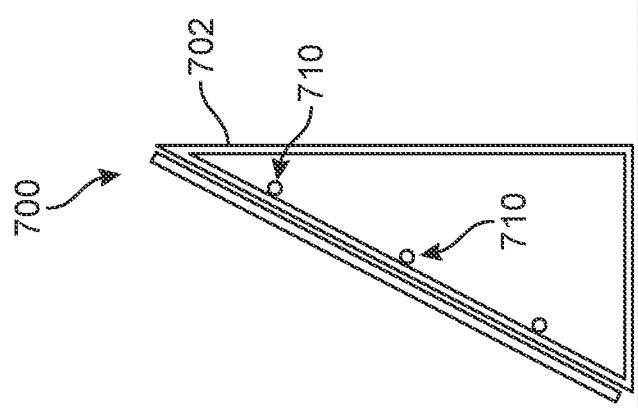
FIG. 7

HEATING AND COOLING OF BUILDINGS USING UNDERGROUND HEAT STORAGE WITH HORIZONTAL BORES

CROSS-REFERENCE TO RELATED APPLICATIONS

This application claims the benefit of Provisional Patent Application No. 63/341,575 filed May 13, 2022, and titled "Heating and Cooling of Buildings Using Underground Heat Storage With Horizontal Bores," which is incorporated by reference herein in its entirety.

TECHNICAL FIELD

The present disclosure generally relates to systems and methods for heating and cooling buildings, and in particular to systems and method for heating and cooling buildings using heat storage mediums.

BACKGROUND

Heating, ventilating and cooling commercial buildings requires a significant amount of electricity and maintenance. Both of these are expensive. In addition, utilities providing electricity emit significant amounts of greenhouse gases as do on-site gas-fired heaters. Most commercial HVAC uses refrigerants that are greenhouse gases that might be released in a leak. Further, commercial systems evaporate a significant amount of water in order to reduce energy consumption.

Some buildings are equipped with geothermal heating and/or cooling systems that leverage the temperature differential between the ambient air and the constant ambient temperature of subterranean regions beneath the building. However, these systems require heat pumps and typically heat or cool the air, which has a low heat capacity, in a conventional forced air system. Moreover, depending on the climate and the ambient subterranean conditions below the building, it may not be cost effective to provide significant heating and/or cooling by leveraging existing thermal differentials that are typical in the winter and/or summer months.

There is a need in the art for a system and method that addresses the shortcomings discussed above.

SUMMARY

In some aspects, the techniques described herein relate to a system for extracting and storing heat in a subterranean layer including rock, including: an assembly of pipes, further including: a first primary pipe and a second primary pipe; a plurality of secondary pipes running between, and connecting, the first primary pipe and the second primary pipe; wherein in an installed configuration of the assembly of pipes within the subterranean layer including rock: the plurality of secondary pipes extend between the first primary pipe and the second primary pipe; and the first primary pipe and the second primary pipe are disposed at opposing ends of the assembly of pipes.

In some aspects, the techniques described herein relate to a system for extracting and storing heat in a subterranean layer including rock, including: an assembly of pipes, further including: a first primary pipe and a second primary pipe; a plurality of secondary pipes running between, and connecting, the first primary pipe and the second primary pipe; wherein in an installed configuration of the assembly of pipes within the subterranean layer including rock the assembly of pipes are arranged as: a first subset of pipes oriented along a first hemispheric surface; a second subset of pipes oriented along a second hemispheric surface; and wherein the first subset of pipes are disposed vertically above the second subset of pipes.

In some aspects, the techniques described herein relate to a method of constructing a system for extracting and storing heat in a subterranean layer including rock for use in heating and cooling a building, including: drilling a first borehole into a subterranean material at a first location, the subterranean material including rock; drilling a second borehole into the subterranean material at a second location that is different from the first location; drilling a third borehole into the subterranean material, the third borehole connecting the first borehole and the second borehole; installing an assembly of pipes within the boreholes, by: placing a first segment of pipe into the first borehole; placing a second segment of pipe into the second borehole; and placing a third segment of pipe into the third borehole, wherein the third segment of pipe connects the first segment of pipe and the second segment of pipe; and connecting the first segment of pipe, via one or more intermediate pipes, to first segment of internal pipe within the building and connecting the second segment of pipe, via one or more intermediate pipes, with a second segment of internal pipe within the building.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 5A-B are schematic views showing flow of water through segments of pipe during winter operation and summer operation, respectively, according to an embodiment;

FIG. 7 is a schematic view of solar panels that may be used as heat radiators, according to an embodiment;

DESCRIPTION OF EMBODIMENTS

Figure 1:
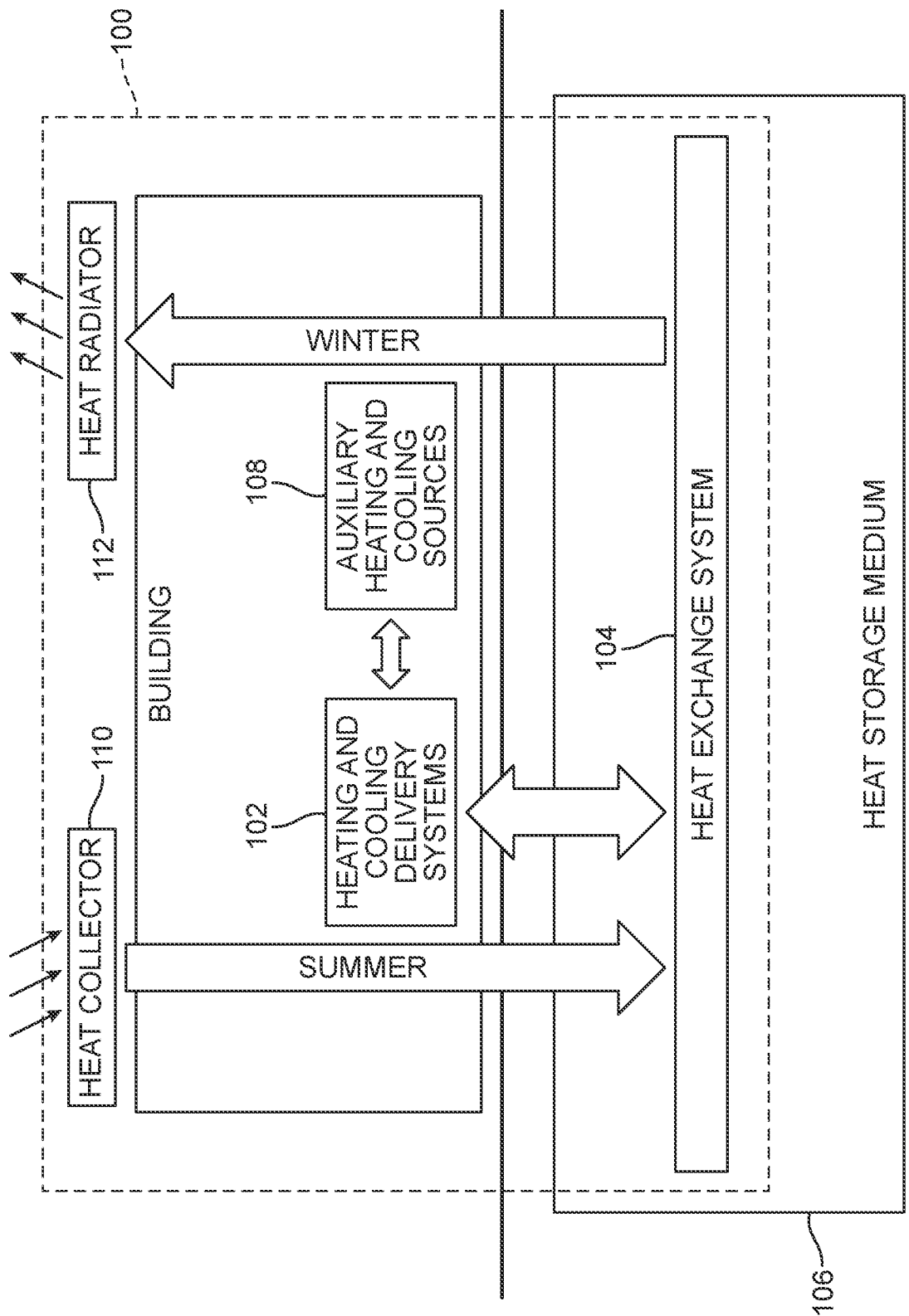
FIG. 1 is a schematic view of a system for heating and cooling a building, according to an embodiment.

The embodiments provide a system and method for providing heating and cooling to a building by leveraging the heat storage capacity of rocks or other geothermal materials under a building. Specifically, the system circulates a fluid through pipes placed within bores in the rocky layers between a building to not only extract, but also store, thermal energy. The fluid is circulated through pipes in the building to deliver radiant heating and cooling, which require a working fluid at close to ambient temperatures to operate. The system does not require heat pumps. The system can also be used to treat ventilated air that is circulated through the building. This is accomplished by providing fluid cool enough to cool and dehumidify the ventilated air during warmer months when air tends to be more humid. During colder months, fluid warm enough to heat outside air can be provided.

With these systems, the rocky layers beneath a building can be used as a heat store (or heat storage medium) that can be charged using excess heat in warmer months. This excess heat can be extracted from fluid circulating through the building, as well as from, for example, heat collectors, such as solar water heaters. The excess heat is deposited in the rocks beneath a building during warmer months and then extracted from the rocks in the winter. The extracted heat can be used to heat the building (via the radiant heating system). Excess heat can also be released using heat radiators, for example, by coupling the radiant heating and cooling pipes to solar panels, which can discharge thermal energy efficiently.

By contrast with conventional geothermal heating and cooling, which use heat pumps to extract or deposit heat into an (underground) environment with a sufficiently constant ambient temperature, the exemplary systems and methods use a heat storage medium that behaves like a capacitor or battery. The exemplary heat storage medium (comprised of subterranean material including rock) does not maintain a constant temperature, but can be charged (heated) or discharged (cooled) using the proposed heat exchange systems. By contrast, excess energy cannot be 'saved' for later use in conventional geothermal systems, nor can excess capacity for future thermal storage be 'created'.

Depending on the local climate and building specifications, the proposed system could be used as the primary source of heating and cooling a building. In other cases, the proposed system can be used in combination with an auxiliary heating and cooling source that may be powered by electricity, gas, or other suitable fuel source. By leveraging the thermal capacity of the rocky layers under a building, the proposed system can be used to significantly reduce operational costs for heating and cooling buildings.

Also provided are methods of constructing and using heat exchange systems that can be coupled to a heat storage medium (such as rock) to store and extract thermal energy, as well as methods for using existing rock as heat storage mediums.

For convenience, various terms are gathered and defined here.

As used herein, the term "building" refers to any physical structure that can provide shelter. Buildings can include houses, apartment buildings, office buildings, factory buildings and other types of buildings.

As used herein, the term "pipe" refers to a tube of metal, plastic, or other material that convey fluids such as water or gas. In some embodiments, pipes could be plastic pipes or tubing that may be flexible, such as tubing constructed of cross-linked polyethylene (PEX). In some cases, pipes may be manufactured using High Density Poly Ethylene (HDPE).

As used herein, the term "borehole" (or simply "bore") refers to a hole drilled into the earth. Boreholes may generally have a depth (or length) that is substantially greater than their width. The term "bore field" refers to a plurality of bores drilled into a particular region of earth.

As used herein, the term "heat storage medium" refers to any medium including material(s) having a sufficient heat capacity to store thermal energy for use at a later time. Here, "at a later time" means on the order of hours, days or even months. A heat storage medium may also be referred to as a "thermal capacitor" that can be heated (charged) and cooled (discharged). Examples of materials with relatively high heat capacities include water, ice, rock and wet sand. For comparison, water has a heat capacity that is approximately six times as much as the heat capacity of air. Typical rocks can have heat capacities that are three times greater than air. Throughout the embodiments, the term heat storage medium may specifically refer to subterranean regions of earth that include at least some rock.

The term "heating and cooling delivery system" refers to any collection of components that deliver or otherwise circulate fluid through a building for the purposes of heating, cooling, and/or dehumidifying air in the building. The specific components used may differ according to the type of heating and cooling system used. For example, in forced air systems, the heating and cooling delivery system may comprise supply ducts, return ducts, as well as supply registers and return registers. In a radiating heating and cooling system, the heating and cooling delivery system can include pipes for circulating a working fluid (such as water) through floors, ceilings, and/or walls of a building. In some cases, a building could include ducts and vents for circulating air, as well as pipes for circulating water.

The term "heating and cooling source" refers to components used to heat and/or cool a fluid, such as air or water, which may then be delivered or circulated through a building using one or more heating and cooling delivery systems. For example, boilers, gas burners, electrical coils, geothermal bodies and other suitable components could be used for heating air and/or water. In some embodiments, a heating and cooling source may utilize compressors and expansion valves to compress and expand a working fluid as part of the processes of heating and/or cooling air. In some cases, heating and cooling sources may take conventional forms such as furnaces, boilers, and air conditioning units.

The term "heat exchange system" refers to components for coupling two thermal sources, such as two sources of air, or a source of water and a source of air, so that thermal energy can be transferred between them. For example, many furnaces have heat exchangers that transfer thermal energy from air that has been combusted to air being circulated through the building. Another example of a heat exchange system is a piping system that allows thermal energy to be transferred between a working fluid contained in the pipes and an external source, such as a region of rock or other material under a building.

The term "heat collector" refers to any component or system that can collect heat from the environment, while a "heat radiator" refers to any component that can radiate heat into an environment. Of course, all materials may collect and radiate heat in different quantities. Thus, while not limiting, the terms heat collector and heat radiator may often be used to refer to components that are more efficient at collecting or radiating heat compared to some reference component, which may be determined according to a given context.

As used throughout the detailed description and the claims, the term "fluid communication" refers to a configuration of two components in which a fluid can pass between one component and the other. For example, two pipes that are connected by a valve or other coupling may be said to be in fluid communication (if the valve is open), as fluid can pass from one to the other. In the context of two pipes, the term "connected" may also be understood to mean that the pipes are in fluid communication (or can be placed in fluid communication given particular settings of valves at their coupling).

FIG. 1 is a schematic view of a building with one or more heating and cooling systems 100. Heating and cooling systems 100 can include a one or more heating and cooling delivery systems 102 (such as ducts, pipes, or other suitable delivery systems). Heating and cooling systems 100 may also include a heat exchange system 104 that facilitates charging and discharging heat from a heat storage medium 106 (such as rock). In configurations where heating and cooling cannot be accomplished using only heat exchange system 104 coupled to heat storage medium 106, heating and cooling systems can also include one or more auxiliary heating and cooling sources 108. These can include, for example, gas or electrically powered furnaces, boilers, air conditioning units or other suitable heating and cooling sources. As used herein, the term auxiliary is not intended to be limiting. In some cases, auxiliary systems may be used to provide as much, or more of, the heating and cooling of the building as the heat exchange system coupled to the heat storage medium.

Charging and discharging of heat storage medium 106 (for example, of a region of rock) occurs via the heat exchange system 104. Specifically, in some embodiments, the heat exchange system 104 comprises an assembly of pipes that can circulate a working fluid through bores in rock (or subterranean region including rock). Excess heat in the working fluid, relative to the temperature of the rock, can then be transferred to the rock to store heat (that is, to charge the heat storage medium). In situations where the working fluid is much cooler than the surrounding rock, the thermal energy can be transferred from the rock to the working fluid (that is, to discharge the heat storage medium).

In some situations, there may be excess heat in an external environment of the building that could potentially be extracted and stored in the heat storage medium. For example, a great deal of solar energy may be available for capture that can be used to charge the heat storage medium above and beyond the excess heat that can be extracted by the circulating working fluid after the building has been sufficiently cooled. Therefore, heating and cooling systems 100 of the embodiments can be equipped with a heat collector 110 to collect thermal energy from the environment, such as solar energy.

In some situations, there may be excess thermal energy in the heat storage medium above and beyond what is needed to heat the building. To help cool (that is, discharge) the heat storage medium during (or at the end of) winter, ensuring there is sufficient capacity to capture heat in the summer, heating and cooling systems 100 of the embodiments may be equipped with a heat radiator 112 to radiate excess heat into the environment.

Figure 2:
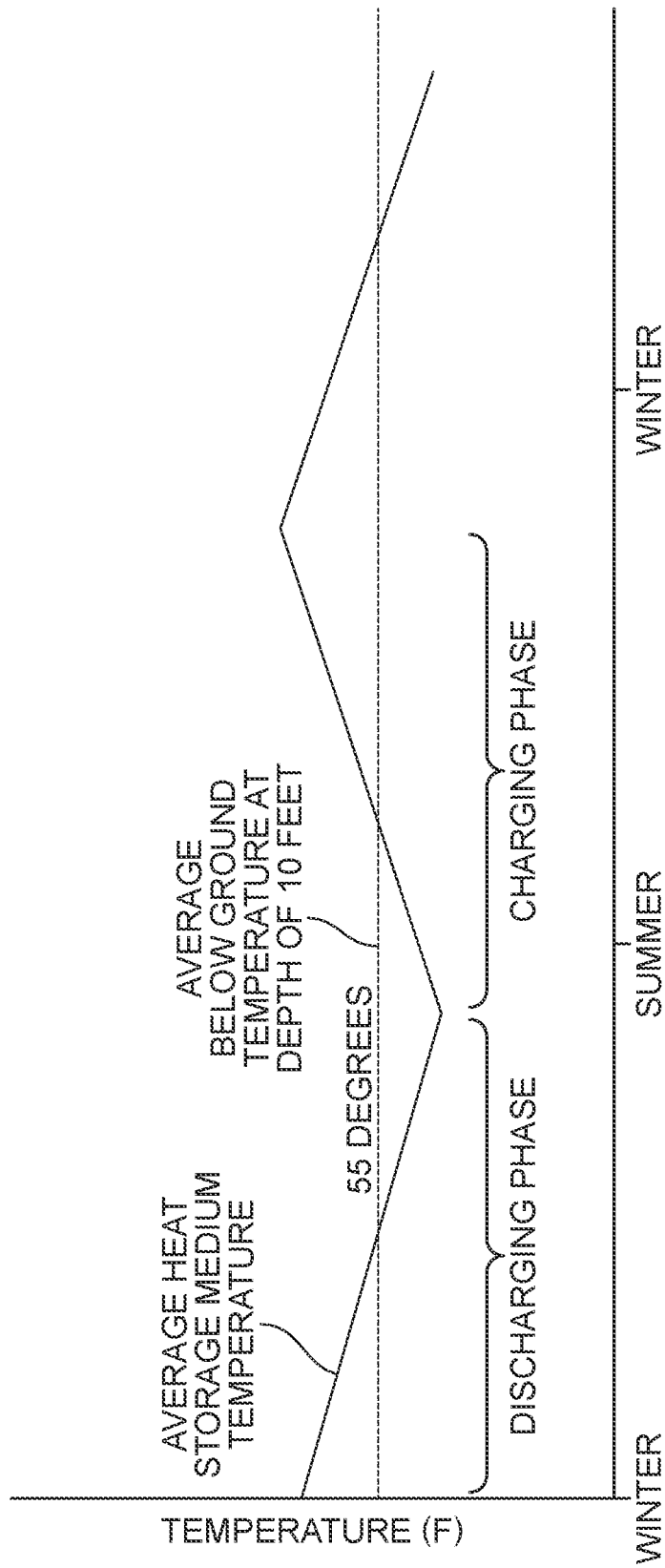
FIG. 2 is a schematic view of seasonal temperature variations of a heat storage medium as it is charged and discharged by a heat exchange system, according to an embodiment.

FIG. 2 is a schematic view of a chart showing temperature variations for a heat storage medium, such as a subterranean region of rock, as a function of season. This shows that the average temperature of the heat storage medium is highest during, or just prior to, the winter, and lowest in, or just prior to, the summer. Moreover, throughout the winter the medium is discharged/cooled, while throughout the summer the heat storage medium is charged/heated. This allows excess heat to be used for heating the building at the height of winter, and sufficiently discharging the heat storage medium so that it has maximum capacity to accept heat throughout the summer.

For reference, a constant ambient temperature of 55 degrees is also shown. This corresponds to the average below ground temperature of many climates at a depth of around 10 feet. This may be considered as a constant working temperature for geothermal systems that use a heat pump to heat and cool buildings. By contrast with such systems that simply mine heat from a region having an approximately constant temperature, the exemplary system uses a heat storage medium to store excess heat in the summer for use in heating a building during the winter, and discharge excess heat in the winter that can provide additional capacity for extracting heat from a building in the summer. This process of storing excess heat in the summer and discharging excess heat in the winter provides significant efficiencies in energy use compared to geothermal systems that rely on heat pumps to extract thermal energy from a constant underground temperature for heating and cooling buildings.

It may be appreciated that the exemplary chart is only intended to illustrate the general seasonal variation of the thermal energy stored in the heat storage medium (indicated by the temperature). The exact periods at which the heat storage medium achieves its highest or lowest temperatures may vary according to many factors including the climate, the specific heating and cooling system used, building specifications, and the specific configuration of the heat exchange system that is coupled to the heat storage medium. Moreover, while the temperature is seen to increase and decrease in an approximately linear (and symmetric) manner, the specific temperature curve for a given system may also vary according to various factors. Moreover, depending on the climate, the difference between the temperature peaks and a baseline (such as the 55 degree line) could vary. In some cases, the difference between the highest temperature and a baseline may be much greater than the difference between the lower temperature and a baseline. In other cases, this directionality could be reversed. Because of this, and according to various other specifications of a building and a building's heating and cooling systems, it may be cost efficient to run the exemplary system for some parts of the year but not others.

Figure 3:
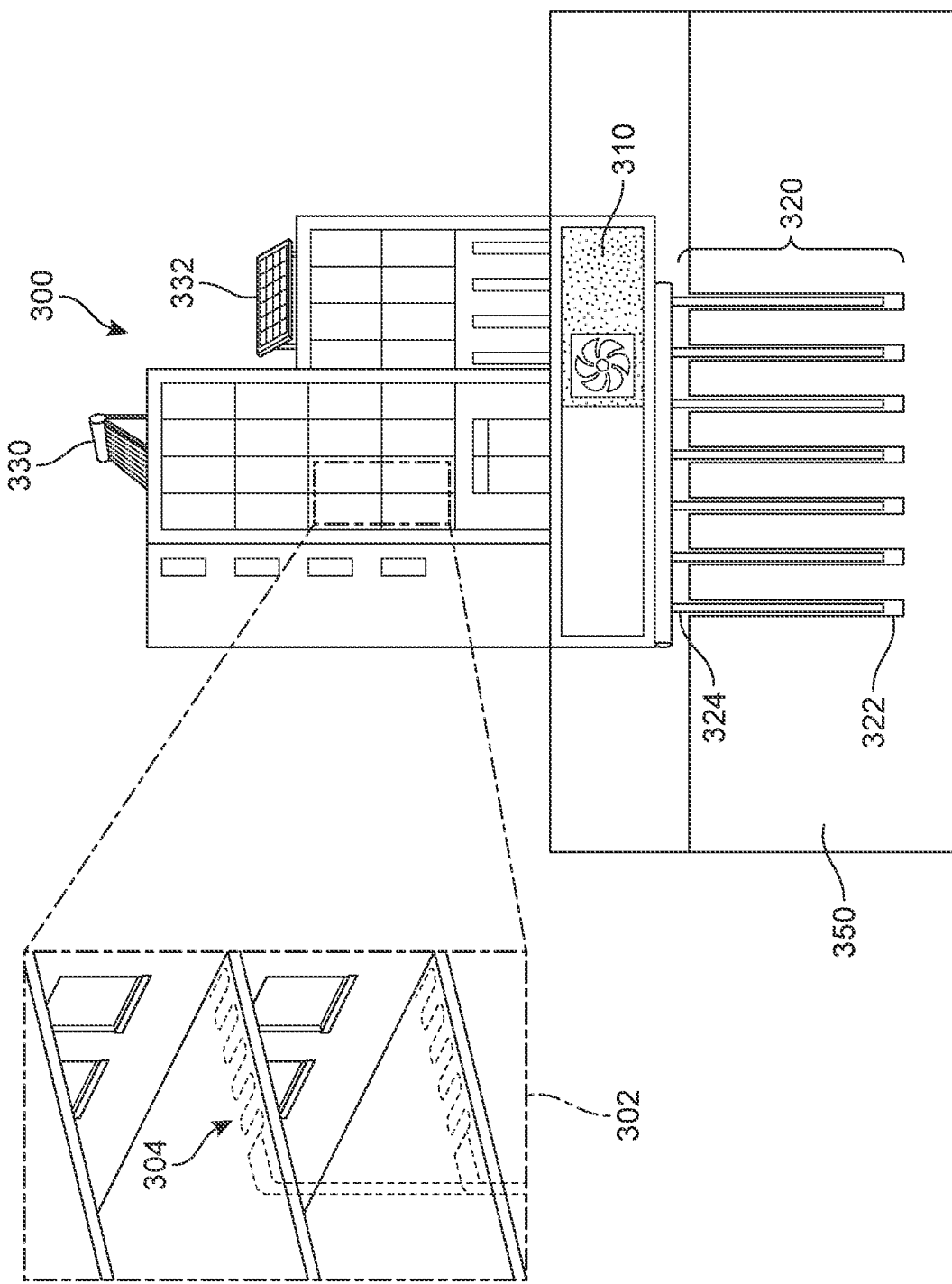
FIG. 3 is a schematic view of a particular implementation of a heating and cooling system that uses radiant heating and cooling in a building coupled to a rock layer used as a heat storage medium, according to an embodiment.

FIG. 3 is a schematic view of an embodiment of a heating and cooling system for a building 300 that uses radiant heating and cooling. That is, as seen in the enlarged cross-sectional view 302 within FIG. 3, the building can be heated and cooled using radiant floor heating 304. More specifically, hydronic radiant heating and cooling are used. In hydronic radiating heating and cooling, a working fluid such as water is circulated through pipes in the building to extract and/or release heat into the interior environment of the building. By contrast with conventional radiant heating or cooling systems, which use electricity or combustion to heat the working fluid, the embodiments use a heat exchange system coupled to a heat storage medium as at least one source of heating and cooling. Of course, depending on the building specifications, the heat storage medium may not provide sufficient thermal energy (or capacity) to completely heat and/or cool the building at all times during the year, and so the building could also be equipped with other heating and/or cooling sources (auxiliary heating and cooling sources). For example, the embodiments are also equipped with an air handling unit 310. Air handling unit 310 can provide auxiliary heating and/or cooling using conventional heaters, furnaces, air conditioning units, or other heating and/or cooling sources. Although not shown, the building may also include a ventilation system (including ducts and registers) for delivering treated air and venting exhaust air from the building. Even in situations where all heating and cooling is achieved using the heat exchange system coupled to the heat storage system, an air handling unit may be used to draw in clean air and vent out treated air.

The embodiment includes a heat exchange system 320. The heat exchange system, shown schematically, is comprised of vertical bores 322 (or shafts) in a rock layer 350. A set of (possibly continuously connected) pipes 324 run through the bores. Pipes 324 are connected back to the building allowing the working fluid that heats and cools the building to be circulated through the rock for extracting and releasing heat. In some embodiments, some pipes may also connect to the air exchanger to allow ventilated air to be dehumidified and cooled in the summer.

The heating and cooling system shown in FIG. 3 also includes solar water heaters 330 that act as heat collectors, as well as solar panels 332 that act as heat radiators. These can be coupled to pipes 324 of the radiant heating and cooling system using any suitable configuration.

Figure 4:
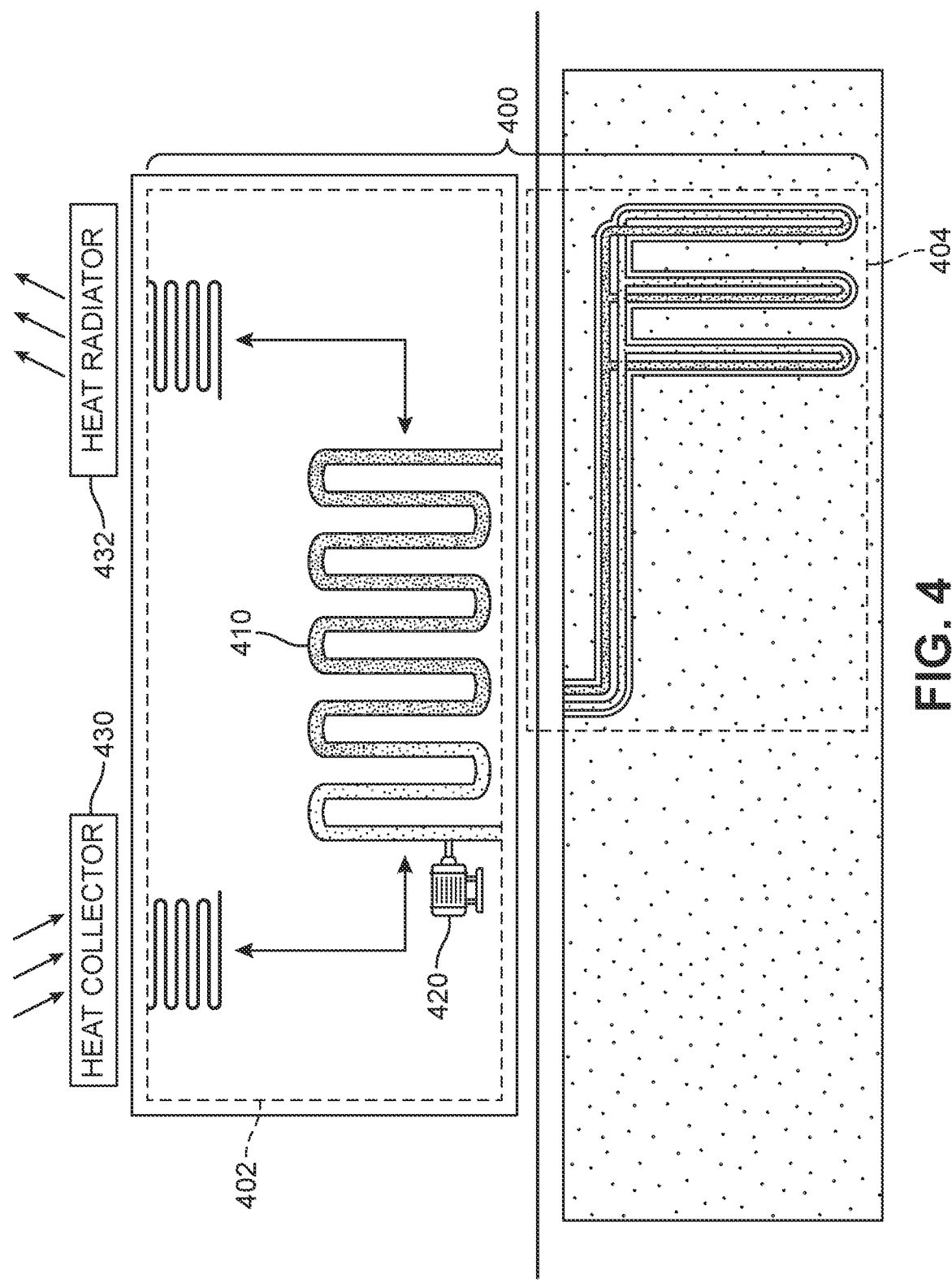
FIG. 4 is a schematic view of a radiant heating and cooling circuit, according to an embodiment.

For purposes of clarity, FIG. 4 depicts a schematic view of a radiant heating and cooling circuit 400 ("circuit 400"). This circuit may be comprised of pipes 410 for circulating a working fluid (such as water). The circuit may be an open circuit or a closed circuit. The circuit could also comprise one singular loop or multiple interconnected loops. In some cases, for example, pipes associated with a heat collector and/or a heat radiator could be part of a single loop that circulates fluid throughout the building, while in other cases additional and/or separate loops could circulate fluid adjacent a heat collector and/or heat radiator.

The circuit could also include one or more pumps 420 that can circulate the working fluid in a first direction or a second (opposite) direction. As described in further detail below, the working fluid may circulate in a first direction to extract heat from a heat storage medium and in a second direction to deposit heat in the heat storage medium, depending on the season.

The radiant heating and cooling circuit 400 can be further seen to comprise a first circuit portion 402 (or "building circuit 402") and a second circuit portion 404 (or "ground circuit 404"). Building circuit 402 is disposed within (or directly adjacent to) the building. Ground circuit 404 is disposed within the ground. It may be appreciated that these two circuits are interconnected so that water circulated through the ground to extract heat from, or deposit heat to, the heat exchange medium, is also circulated through the building to heat and/or cool the building. In some cases, building circuit 402 can include pipes for collecting heat captured by one or more heat collectors 430, so that this heat can be used to charge the heat storage medium. Likewise, ground circuit 404 can include pipes for delivering excess heat from the heat storage medium to heat radiators 432, which can then radiate this excess heat to the external environment.

FIGS. 5A-5B illustrate schematic views of portions of the ground circuit. In particular, FIGS. 5A-B show a schematic view of the top portion of a bore 502, as seen in cross-section, including pipes 504 entering and leaving the top of the bore in cross-section. For purposes of illustration, only some portions of the pipe entering and exiting the bore are shown, but it may be appreciated that at each bore, a first straight segment of pipe extends from the top of the bore to the bottom of the bore, makes a U-turn, and then a second straight segment of pipe extends back up to the top of the bore.

As shown in FIG. 5A, during winter the system operates so that cold water from the building is circulated through the ground circuit. In particular, cool water flows into the U-shaped segment of pipe 504 disposed within each bore. The cool water extracts heat from the surrounding rock 512, heating the water, and then exits as warm water that can be delivered to the building for heating. In FIG. 5B, during summer the system operates in the reverse manner, with the circulation direction being opposite that used in the winter. Here, warm water from the building flows into the U-shaped segment of pipe 504 disposed within each bore and is cooled as heat from the water is extracted by the surrounding rock. Then, cooler water leaves the segment of pipe in the bore and is returned to the building for cooling the building.

In some embodiments, an insulated and crush-resistant material 510 can be used around the segment of pipe where cool water enters or exits the bore. This allows the top of the bore to be warmer than the bottom. In some embodiments, each bore may be filled with a thermally conductive grout or similar material to promote heat transfer between the rock and water in the pipes.

Figure 6A:
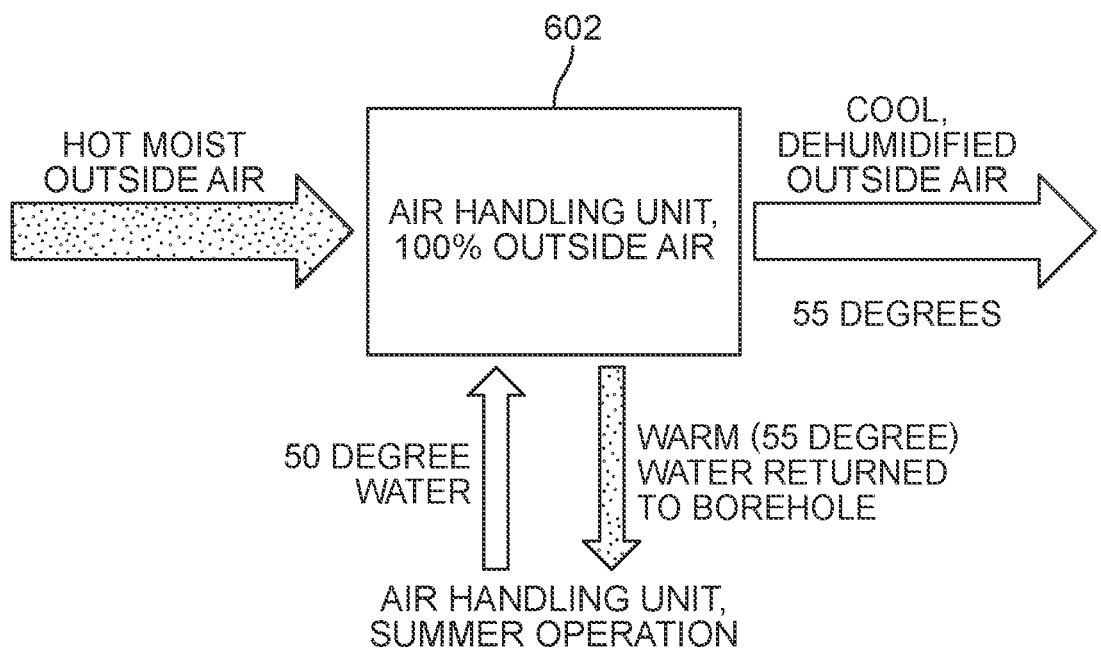
FIGS. 6A-B are schematic views showing treatment of air by an air handling unit during summer operation and winter operation, respectively, according to an embodiment.

As seen in FIG. 6A, the exemplary systems provide a way to cool and dehumidify hot and moist air in the summer. In this example, cooler water (about 50 degrees Fahrenheit) is delivered to an air handling unit 602 of a building. As the hot moist air passes through the air handling unit 602 and over pipes filled with the cooled water, the moisture may condense and heat from the air is extracted by the cooler water. Thus, the air to be circulated through the building is cooled (to about 55 degrees Fahrenheit) and dehumidified, and warmer water (about 55 degrees Fahrenheit) is returned back to the ground circuit (which runs through at least one borehole) for cooling.

Figure 6B:
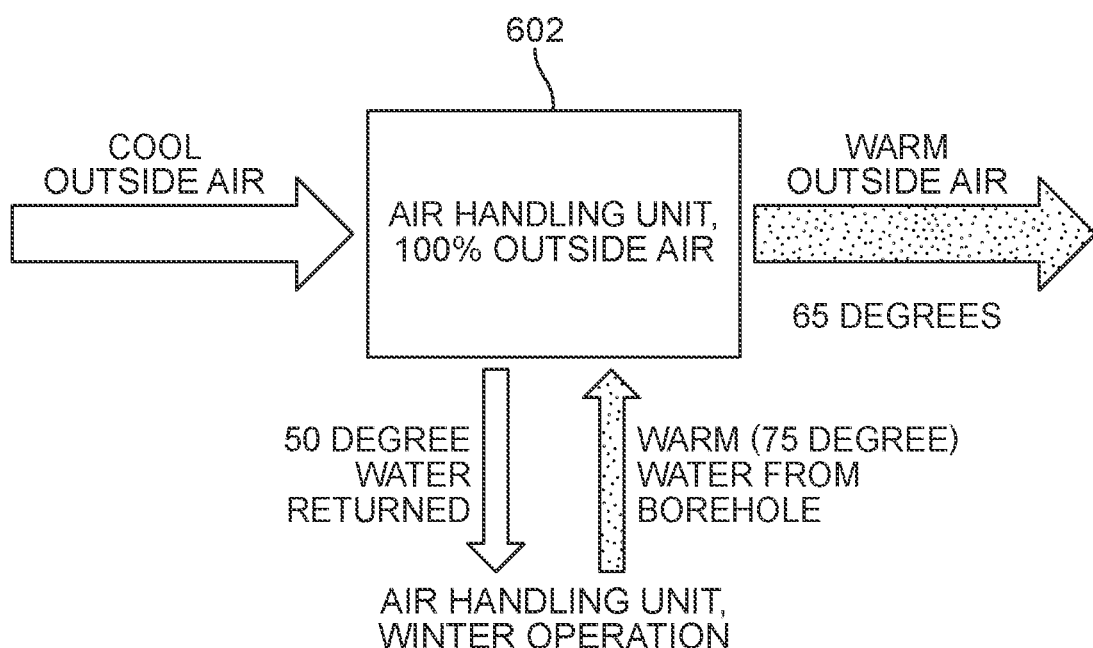

This process can be reversed, as shown in FIG. 6B, during the winter. Here, warm air from the ground circuit is delivered to the air handling unit. Cold air passing through the air handling unit is warmed by pipes filled with the warmer water. Heat is transferred from the water to the cold air, warming the air and cooling the water. This provides warmer air (about 65 degrees Fahrenheit) for circulation through the building and cooler water (about 50 degrees Fahrenheit) is returned back to the ground circuit for heating.

FIG. 7 shows a schematic view of a set of solar panels 700 that may be used for radiating excess heat from the system, especially in cooler months. Each solar panel is mounted to a support frame 702. In some cases, the support frame may be made of aluminum. As shown in FIG. 7, pipes 710 carrying water to be cooled can be fixed to parts of the support frames for each solar panel. Because the panels are themselves mounted to the frames, which may be good conductors, heat can be efficiently transferred from the warm water to the solar panels. That heat can then be radiated into the atmosphere.

Figure 8:
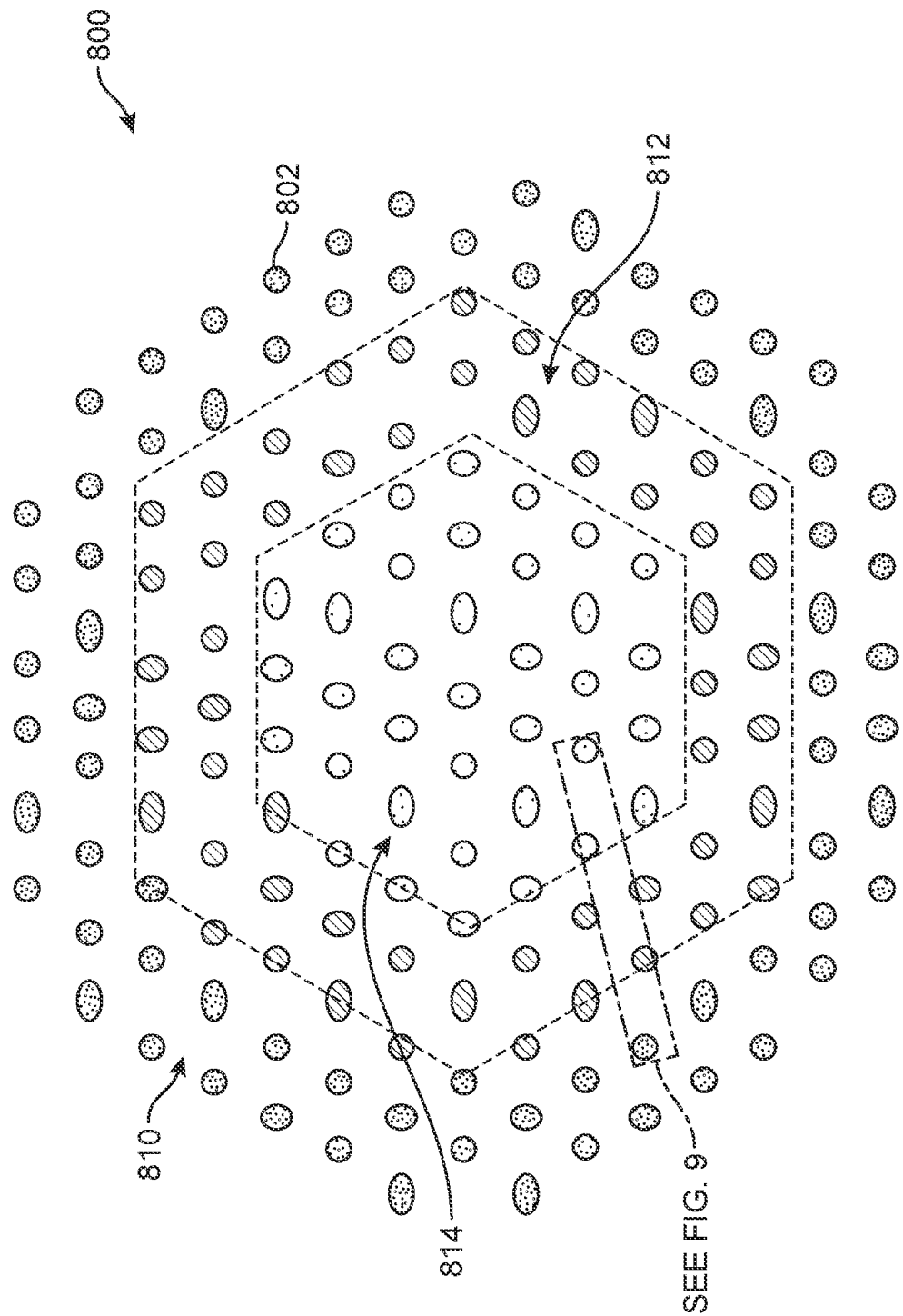
FIG. 8 is a schematic view of a bore field according to an embodiment.

FIG. 8 is a schematic view of a bore field pattern 800. As used herein, a "bore field pattern" refers to the particular configuration in space of the plurality of bores in a bore field. For convenience, bores 802 in the bore field pattern 800 are shown in cross-section as circles or ellipses. Features of the bore field pattern could include bore diameters, bore lengths, the total number of bores, the bore orientations, and their horizontal (or cross-sectional) arrangement.

In FIG. 8, bore field pattern 800 comprises bores arranged in a hexagonal pattern. Moreover, the bores have been organized into three distinct regions, which are colored differently for purposes of illustration. Each different bore field region corresponds with different portions (or volumes) of the rock layer, where each different portion may be heated or cooled to a substantially different temperature compared to adjacent portion. Here, the bore field includes a first bore field region 810, located at the outermost part of the bore field. Also, the bore field includes a second bore field region 812, located just inside of the first bore field region. The bore field also includes a third bore field region 814, located at the center of the bore field.

For purposes of description, the temperature pattern described here demonstrates a particular pattern that could be used in the summer. For winter operation, different temperature patterns could be used. In this example, first bore field region 810 comprises bores within a region of rock intended to be maintained at a first temperature. Second bore field region 812 comprises bores within a region of rock intended to be maintained at a second temperature, where the second temperature is cooler than the first temperature. Third bore field region 814 comprises bores within a region of rock intended to be maintained at a third temperature, wherein the third temperature is cooler than the second temperature.

Using a configuration as shown in FIG. 8, different portions of a rock layer can be heated or cooled to at least three different temperatures. This allows the system to draw on at least three different temperatures for carrying out heating and/or cooling. In one embodiment, for example, the innermost region of rock (third region 814) could be kept cool enough so that water circulated through the bores in this region can be cooled to 50 degrees Fahrenheit or less. Water cooled to 50 degrees can then be used to dehumidify outside air during warmer months. In additional, water circulated through the bores in either of the first region 810 or the second region 812 could be used for radiant cooling in the building (which may be filled with already dehumidified air).

The embodiments are not limited to the particular bore field pattern shown in FIG. 8. Other embodiments could include bores arranged in other geometric patterns, as well as bores oriented in non-vertical directions. In addition, the relative spacing between adjacent bores (or the bore density) could also be changed. Moreover, the particular bore field pattern used can be determined according to various suitable factors, such as the local climate, the footprint of the bore field, specifications (including size and shape) of the building to be heated and/or cooled, and ambient ground temperatures.

To heat the different regions of rock to different temperatures, embodiments could use one or more manifolds and valves to selectively deliver water for circulation through different bore field regions. Additionally, water can be passed through different regions at different rates, which may effect the degree of thermal transfer and result in regions with different temperatures. In addition, the system could be configured so that the coolest water could be selectively delivered to the air handling unit during the summer to dehumidify outside air.

Figure 9:
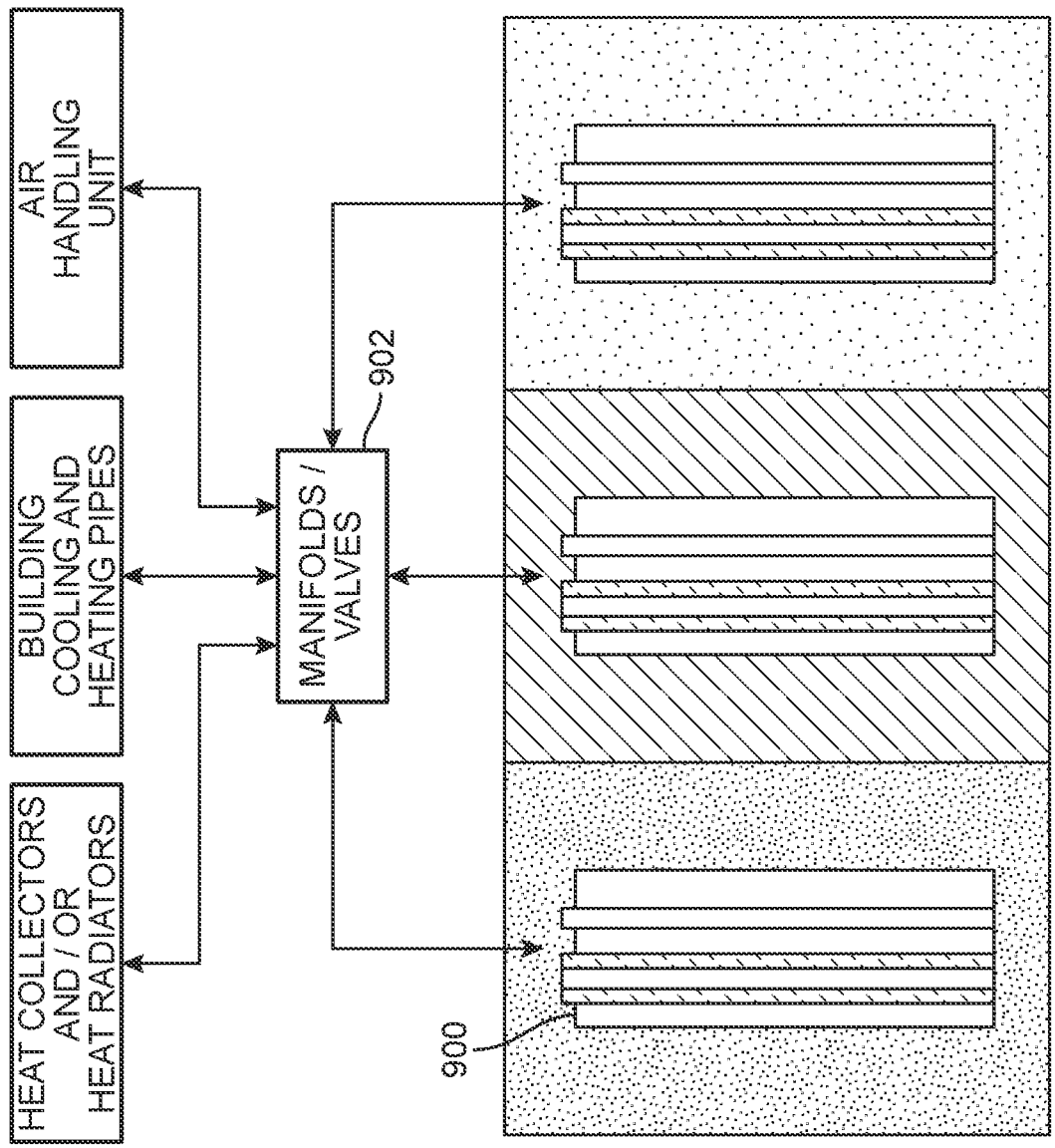
FIG. 9 is a schematic view of a system for managing different bore field regions at different temperatures, according to an embodiment.

A schematic example is shown in FIG. 9, which includes a cross-sectional view of three bores 900 with pipes in the region of the bore field indicated in FIG. 8. In this example, a system of manifolds and valves 902 are used to selectively route water through different segments of system. This allows, for example, water to be selectively circulated through different regions of the bore field in order to add or remove thermal energy from the surrounding regions of rock. Using manifolds and valves also allows water to be selectively circulated to and from heat collectors and/or heat radiators, through building cooling and heating pipes and/or through an air handling unit. In some cases, valves can also be used to control the flow rate of water through the different regions, which may also affect the amount of thermal energy transferred to and from those regions.

In some embodiments, the system could dynamically circulate water to different bore field regions to achieve selected temperature targets for the surrounding rock regions. In other embodiments, the system could be configured so that different regions are always heated or cooled to target temperatures.

Figure 10:
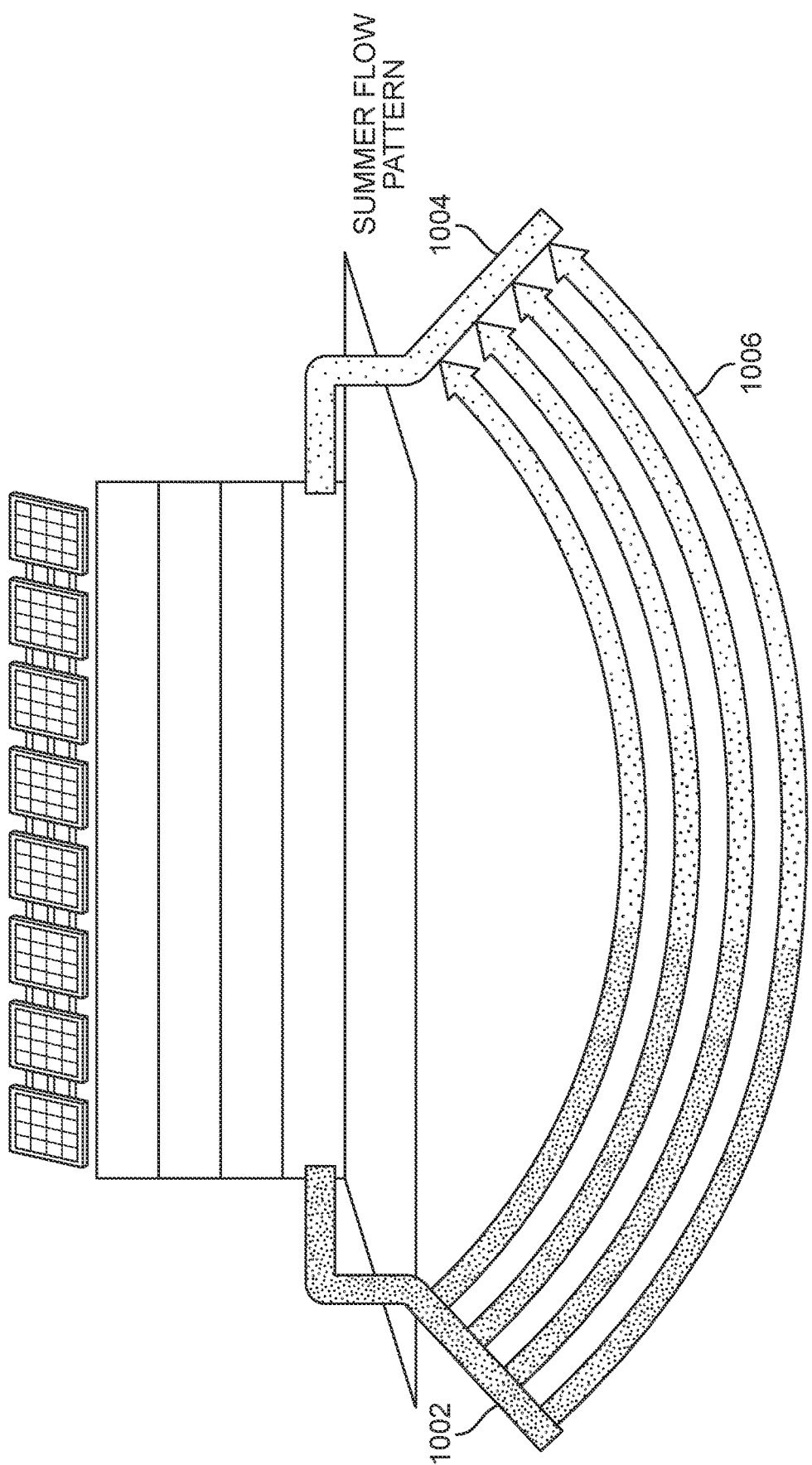
FIG. 10 is a schematic view of a heating and cooling system for a building that uses a heat exchange system with horizontal pipes, according to an embodiment.

The previous embodiments have described bore fields with vertically oriented bores. In other embodiments, bores with different orientations could be used. For example, FIG. 10 depicts a schematic view of a system that utilizes horizontally (or partially horizontally) oriented bores. Schematically, warm water from the building enters and leaves through a warm water port. Likewise, cool water from the building enters and leaves through a cool water port. Each port is further connected to one or more pipes that are inserted through corresponding bores that have been drilled at an angle to the ground surface. Pipes from the cool water side and the warm water side are then connected via horizontally oriented pipes that extend through horizontal bores in the rock layer.

As an example, FIG. 10 shows the flow of circulating water in the summer. Here, warm water from the building exits through the warm water port and travels horizontally through pipes in the rock layer. Because the rock layer has been cooled in the summer (via discharge over the winter), the rock layer extracts excess heat from the water so that the water is cooled by the time it reaches the cool water side. At this point the water passes back into the building to cool the building via radiant cooling.

In the winter, the above process would be reversed, with cool water exiting the building through the cool water side and circulating through horizontal pipes to the warm water side on the other side of the building.

By using horizontal directional drilling techniques, a single point for drilling can be set up at each of the warm and cool water sides. This limits the number of times the drilling equipment must be repositioned. In addition, the piping may be simpler inside the bores since the water would be entering one end of the pipe at one hole and leaving at the other end. Similarly, if the building is sited over a sand aquifer such as the Ogalala and Corizo aquifers, the water can be used as part of the heat sink/heat storage.

As seen in FIG. 10, the assembly of pipes used for the heat exchange system includes a first primary pipe 1002 (on the warm water side) and a second primary pipe 1004 (on the cool water side). These pipes, when installed within boreholes in the rock layer, may be oriented in a direction between a fully vertical direction and a full horizontal direction. The assembly of pipes also includes a plurality of secondary pipes 1006 that run between the warm water port and the cool water port. These secondary pipes are indicated schematically in FIG. 10 using (curved) horizontal arrows.

Typically, pipe assemblies used in geothermal applications include a cool water side and a warm water side that enter and exit a building adjacent one another, so that both sides can be connected with a heat pump. By contrast, in the exemplary embodiment of FIG. 10, the cool water side and the warm water side (that is, the two different primary pipes) are attached at opposing sides of the building. Thus, rather than using loops of piping that travel down and back up out of boreholes for thermal exchange, the exemplary secondary pipes run horizontally through the rock layer to facilitate thermal exchange.

This configuration provides for a simpler installation process for the pipes, which can be run in primarily one direction, rather than having to double back. Moreover, less insulation may be required as the hot and cold sides of the pipe assembly are more spatially separated compared to some other designs.

The exemplary configuration may be especially useful for existing buildings that do not have the space to build a (vertical) bore field adjacent to the building (since drilling beneath an existing building may not be feasible). In particular, in the exemplary design, only a single drill point is required at each side of a building, which could be as close to the building's foundation as is needed. From this single drill point, boreholes can be drilled in a vertical or partially vertical direction to create the spaces where the primary and secondary pipes will be placed. Then, horizontal boreholes can be drilled between the existing boreholes on either side of the building. These horizontal boreholes can be constructed using directional drilling techniques, which are well known in the art. Thus, the exemplary system can be constructed and used with existing buildings, even when those buildings occupy a majority of the horizontal footprint of their lot.

Figure 11:
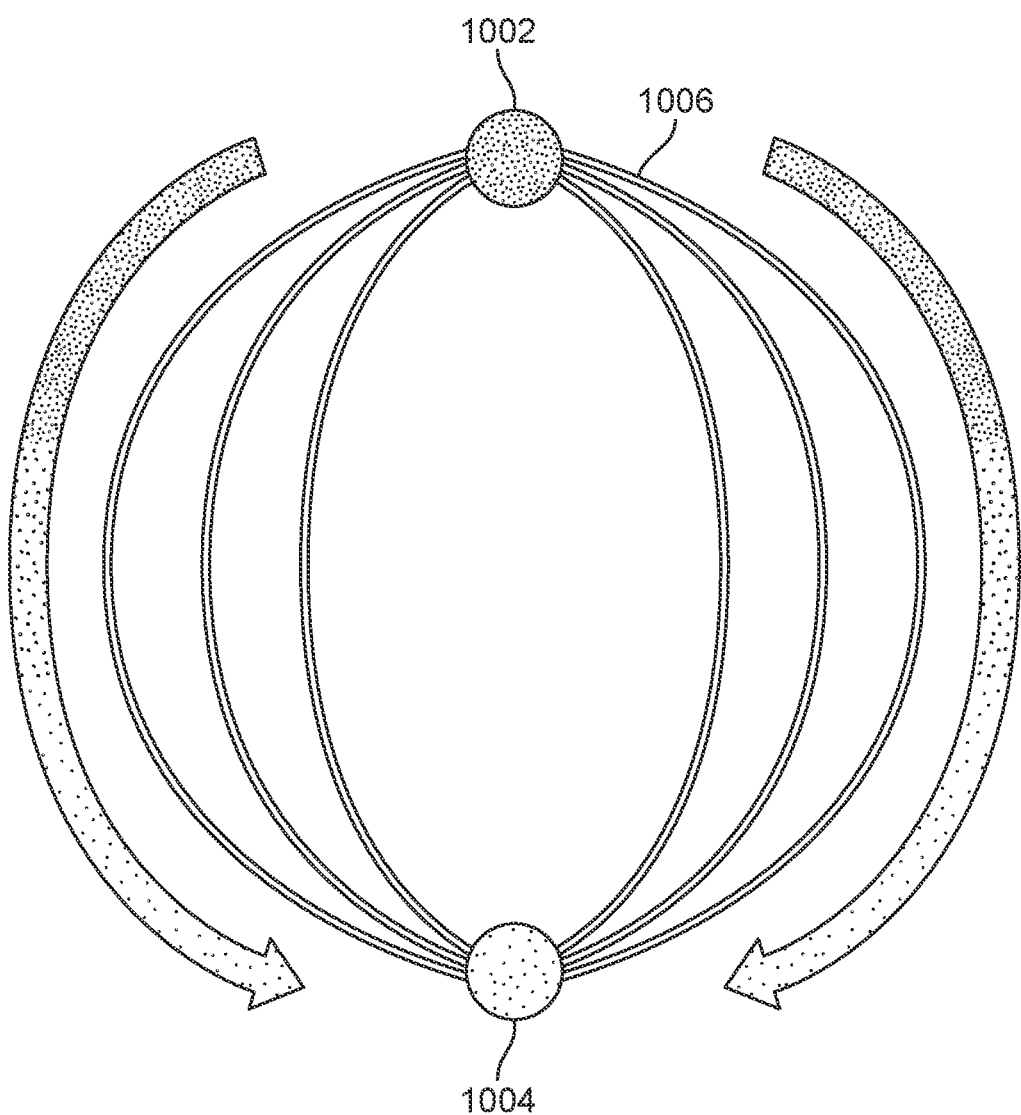
FIG. 11 is a schematic plan view of a single layer of piping arranged in a hemispheric pattern, according to an embodiment.

FIG. 11 shows a plan view of some pipes in the pipe assembly shown in FIG. 10. For clarity, only a single 'horizontal layer' of the assembly is shown. That is, the secondary pipes shown may all have approximately similar depths with respect to the ground. As indicated in FIG. 10, secondary pipes at different depths could be used. In one embodiment, a pipe assembly is comprised of horizontal layers similar to that in FIG. 11, each at different depths. In some cases, the layers of piping could be nested, with deeper layers extending over a greater extent. Moreover, the layers of secondary pipes need not be confined to a single horizonal plane and in some cases the secondary pipes are arranged along nested hemispheric surfaces. In particular, in some cases, the secondary pipes may be arranged along 'longitudinal'-like lines of the hemispheric surfaces.

The embodiments leverage the relatively high heat capacity of rocks or rock-like materials beneath a building to store excess heat in a building for cooling, and that can be extracted at a later time for heating the building. And while rock may not have as high of a heat capacity as other materials like water, a benefit of the exemplary systems is that sufficiently large quantities of rock may be available beneath a building. Therefore, the amount of thermal energy that can be stored (or absorbed when using the rock as a heat sink) can potentially be very large compared to the amount of thermal energy that could be stored in, for example, water tanks. Moreover, the heat storage medium does not need to be constructed or transported, only coupled to a heat exchange system, such as a pipe assembly as described above.

It may be appreciated that while the embodiments describe systems and methods for heating and cooling buildings, in other embodiments similar principles could be used to only heat a building, or to only cool a building.

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A system for extracting and storing heat in a subterranean layer including rock, comprising:
   an assembly of pipes, further comprising:
      a first primary pipe and a second primary pipe;
      a plurality of secondary pipes running between, and connecting, the first primary pipe and the second primary pipe;
   wherein in an installed configuration of the assembly of pipes within the subterranean layer including rock:
      the plurality of secondary pipes extend between the first primary pipe and the second primary pipe; and
      the first primary pipe and the second primary pipe are disposed at opposing ends of the assembly of pipes.

2. The system according to claim 1, wherein the first primary pipe is configured to be connected to a warm water side of a heating and cooling system within a building, wherein the second primary pipe is configured to be connected to a cool water side of the heating and cooling system within the building.

3. The system according to claim 2, wherein the first primary pipe is disposed adjacent a first side of the building and the second primary pipe is disposed adjacent a second side of the building.

4. The system according to claim 1, wherein the plurality of secondary pipes run in an approximately horizontal direction between the first primary pipe and the second primary pipe.

5. The system according to claim 1, wherein the assembly of pipes is configured to be used with a radiant heating system in a building.

6. The system according to claim 1, wherein the assembly of pipes is configured to be used with a radiant cooling system in a building.

7. A system for extracting and storing heat in a subterranean layer including rock, comprising:
   an assembly of pipes, further comprising:
      a first primary pipe and a second primary pipe;
      a plurality of secondary pipes running between, and connecting, the first primary pipe and the second primary pipe;
   wherein in an installed configuration of the assembly of pipes within the subterranean layer including rock the assembly of pipes are arranged as:

a first subset of pipes oriented along a first hemispheric surface;
a second subset of pipes oriented along a second hemispheric surface; and
wherein the first subset of pipes are disposed vertically above the second subset of pipes.

8. The system according to claim 7, wherein the first primary pipe is configured to be connected to a warm water side of a heating and cooling system within a building, wherein the second primary pipe is configured to be connected to a cool water side of the heating and cooling system within the building.

9. The system according to claim 8, wherein the first primary pipe is disposed adjacent a first side of the building and the second primary pipe is disposed adjacent a second side of the building.

10. The system according to claim 7, wherein the assembly of pipes is configured to be used with a radiant heating system in a building.

11. The system according to claim 7, wherein the assembly of pipes is configured to be used with a radiant cooling system in a building.

12. The system according to claim 7, wherein the assembly of pipes is configured to be installed beneath a building.

13. The system according to claim 7, wherein the system includes a heat radiator in fluid communication with the assembly of pipes.

14. The system according to claim 13, wherein the heat radiator includes a solar panel.

15. The system according to claim 7, wherein the system includes a heat collector in fluid communication with the assembly of pipes.

16. The system according to claim 13, wherein the heat radiator includes a solar water heater.

* * * * *